(12) United States Patent
Massel

(10) Patent No.: US 12,702,939 B2
(45) Date of Patent: Aug. 11, 2026

(54) REJECTOR CARTRIDGE

(71) Applicant: Evoqua Water Technologies LLC, Pittsburgh, PA (US)

(72) Inventor: Chad Massel, Grand Rapids, MI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 504 days.

(21) Appl. No.: 18/282,601

(22) PCT Filed: Mar. 18, 2022

(86) PCT No.: PCT/US2022/020929
§ 371 (c)(1),
(2) Date: Sep. 18, 2023

(87) PCT Pub. No.: WO2022/198035
PCT Pub. Date: Sep. 22, 2022

(65) Prior Publication Data

US 2024/0216837 A1 Jul. 4, 2024

Related U.S. Application Data

(60) Provisional application No. 63/162,707, filed on Mar. 18, 2021.

(51) Int. Cl.
*B01D 25/21* (2006.01)

(52) U.S. Cl.
CPC .................................. *B01D 25/215* (2013.01)

(58) Field of Classification Search
CPC ..... B01D 25/02; B01D 25/164; B01D 25/215
See application file for complete search history.

(56) References Cited

U.S. PATENT DOCUMENTS

| | | | |
|---|---|---|---|
| 3,347,383 | A | 10/1967 | Augerot |
| 2004/0238598 | A1 | 12/2004 | Timperio |
| 2008/0257814 | A1 | 10/2008 | Vigna et al. |
| 2010/0181242 | A1 | 7/2010 | Hermann |
| 2013/0168303 | A1 | 7/2013 | Appling et al. |

FOREIGN PATENT DOCUMENTS

| | | | |
|---|---|---|---|
| DE | 4136906 A1 * | 5/1993 | ........... B01D 25/285 |

OTHER PUBLICATIONS

Valerius—DE4136906A1 merged original document and FIT translation—May 13, 1993 (Year: 1993).*
Mainhard, Max, “Search Report”, Chilean Patent Application No. 202302772, mailed Aug. 18, 2025, 34 pages.
Mainhard, Max, “Examination Report”, Chilean Patent Application No. 202302772, mailed Mar. 25, 2025.

(Continued)

*Primary Examiner* — Bradley R Spies

(57) ABSTRACT

A method of retrofitting a filter plate including a filtration zone and a frame surrounding the filtration zone for use in a filter press. The frame of the filter plate is altered to removably receive a filtrate cartridge, the filtrate cartridge constructed and arranged to facilitate flow out of a filtration chamber of the filter press associated with the filtration zone to a discharge port. The filtrate cartridge is inserted in the frame. Related filter plates and filter presses are also disclosed.

20 Claims, 9 Drawing Sheets

(56) References Cited

OTHER PUBLICATIONS

Da Silva, Gilson, "Search Report", Brazilian Patent Application No. BR112023017326-4, mailed Feb. 9, 2026, 8 pages.
Dong, Zhou, "Rejection Decision", Chinese Patent Application No. 202280019087.X, mailed May 10, 2025.
Unknown, "Third Office Action", Chinese Patent Application No. 202280019087.X, mailed Mar. 12, 2025.
Unknown, "Second Office Action", Chinese Patent Application No. 202280019087.X, mailed Dec. 21, 2024.
Dong, Zhou, "First Office Action", Chinese Patent Application No. 202280019087.X, mailed Jul. 20, 2024, 9 pages.
"International Preliminary Report on Patentability" dated Sep. 12, 2023 for corresponding Application No. PCT/US2022/020929.
"International Search Report" dated Jun. 22, 2022 for corresponding Application No. PCT/US2022/020929.

* cited by examiner

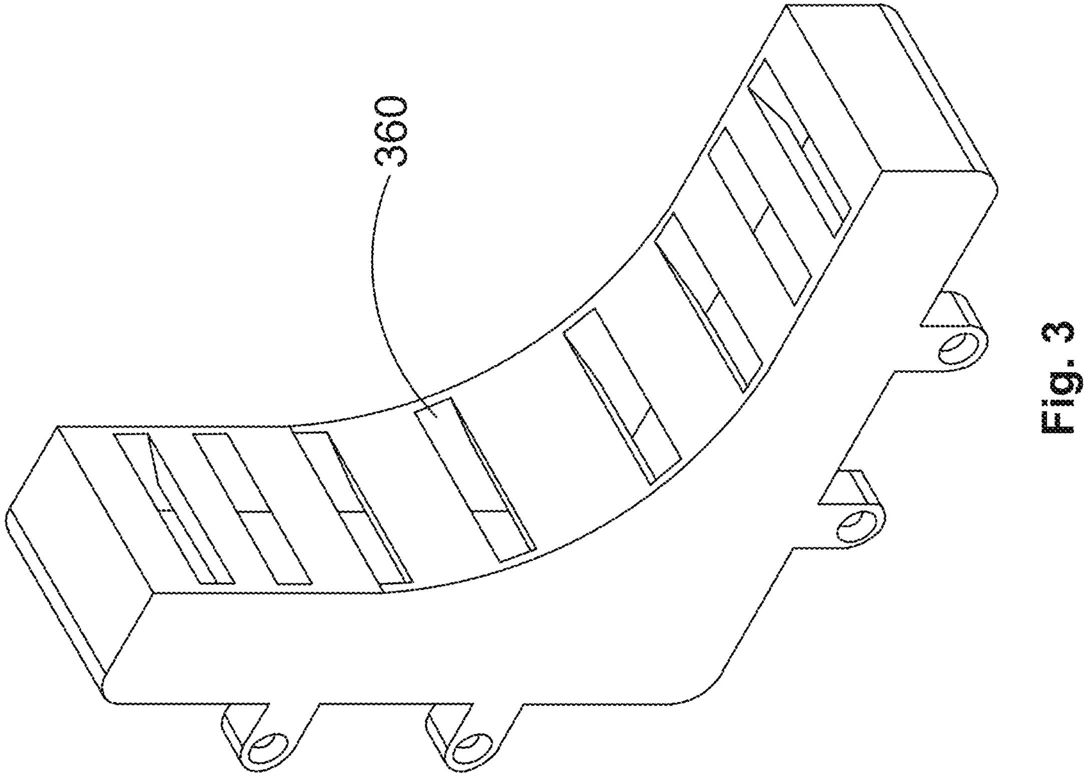
Fig. 3
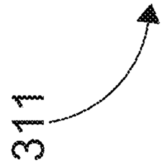

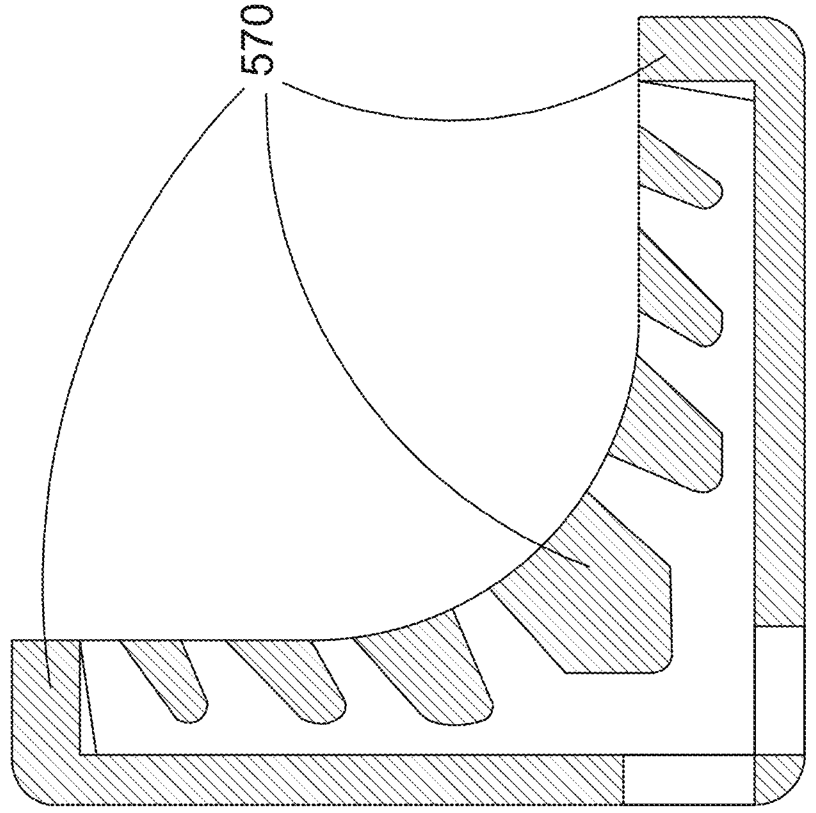
570
Fig. 5
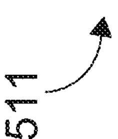
511

680
611a 611b
680

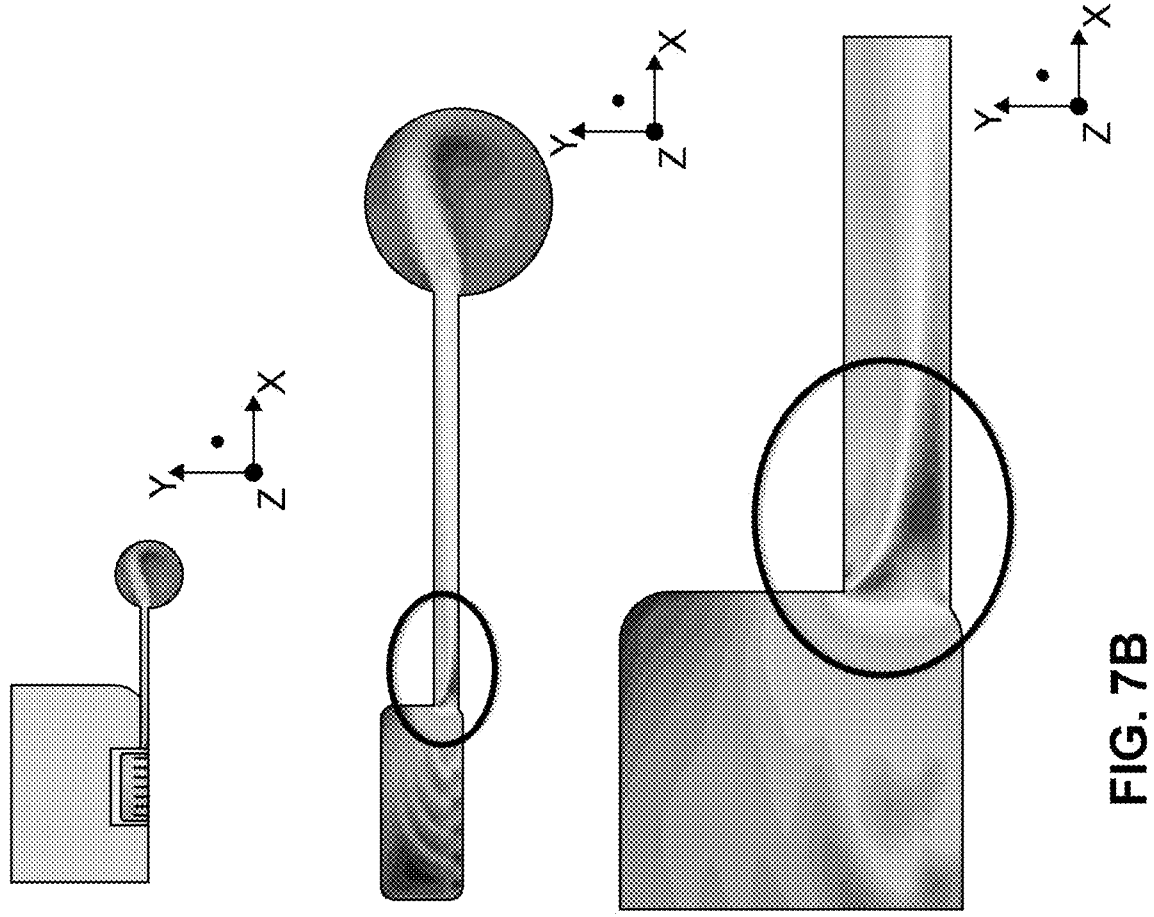
FIG. 7B
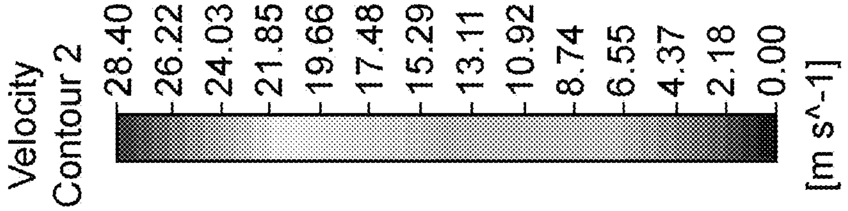

REJECTOR CARTRIDGE

CROSS REFERENCE TO RELATED APPLICATION

This application claims priority under 35 U.S.C. § 119(e) to U.S. Provisional Patent Application Ser. No. 63/162,707, titled "REJECTOR CARTRIDGE" and filed on Mar. 18, 2021, the entire disclosure of which is hereby incorporated herein by reference in its entirety for all purposes.

FIELD OF TECHNOLOGY

Aspects and embodiments disclosed herein relate generally to filter presses and, more particularly, to methods of retrofitting filter plates associated with filter presses for enhanced performance.

BACKGROUND

Filter presses are well known and extensively utilized for separating solids from slurries. Such filter presses generally employ a plurality of filter plates which are held in contacting relationship between fixed and movable head members while slurry is pumped into and through the press for collecting the solids in the form of cake between adjacent filter plates. Squeezing, and optionally heating, operations may facilitate cake formation. When the press is full, the movable head is backed away from the plates into an open position and the plates are moved into an open position to permit discharge of the cake which is collected between adjacent pairs of plates. To permit movement of the plates into an open position, plate shifting mechanisms are typically provided adjacent opposite sides of the press for permitting automatic or manual control over the plate movement and cake discharge.

SUMMARY

In accordance with one or more aspects, a method of retrofitting a filter press plate is disclosed. The method may involve providing a filter press plate including a recessed face defining a filtration zone and a frame surrounding the filtration zone, altering the frame to removably receive a filtrate cartridge, the filtrate cartridge constructed and arranged to facilitate flow out of a filtration chamber formed by filtration zones of adjacent filter plates to a discharge port, and inserting the filtrate cartridge in the frame.

In some aspects, the filtrate cartridge may be positioned outside of the filtration zone of the filter plate. The filtrate cartridge may be positioned within a sealing area of the filter plate. The filtrate cartridge may be positioned in a corner of the frame. In at least some aspects, the filter plate may not be used to mount the filtrate cartridge. In certain aspects, the filtrate cartridge does not extend into the filtration zone of the filter plate.

In some aspects, the filtrate cartridge is of modular construction. The method may further comprise bridging first and second components of the modular filtrate cartridge to accommodate a thickness of the filter plate. The filtrate cartridge may define a plurality of flow channels. The filtrate cartridge may be configured to reduce filtrate velocity and/or turbulence at the discharge port. The filtrate cartridge may be configured to facilitate flow distribution and/or throughput in the filtration chamber. The filter plate may include an integral manifold port to facilitate fluid communication with the discharge port via the filtrate cartridge.

In some aspects, the method may further comprise plugging a preexisting outlet in the frame. The method may further comprise fluidly connecting the filtrate cartridge to the discharge port. The method may further comprise altering the frame to removably receive a second filtrate cartridge and inserting the second filtrate cartridge in the frame. The first and second filtrate cartridges may be on opposite faces and opposite sides of the filter plate.

In some aspects, the method may further comprise installing the retrofitted filter plate in a filter press. The method may further comprise introducing a source of a slurry to the filter press for separation. The source of the slurry may be associated with a mining operation. In some aspects, the filtrate cartridges may be made of a corrosion-resistant material. The method may further comprise taking the filter press offline and replacing the filtrate cartridge in the filter plate after a predetermined period of time. In some aspects, the method may further comprise retrofitting at least two filter plates and installing the at least two retrofitted filter plates in the filter press.

In accordance with one or more aspects, a filter plate is disclosed. The filter plate may be formed by any retrofitting method described herein.

In accordance with one or more aspects, a filter plate is disclosed. The filter plate may include a filtration zone and a frame surrounding the filtration zone. The frame may include first and second outlets, the first outlet being intentionally blocked. The filter plate may further include a removable filtrate cartridge in the frame and in fluid communication with the second outlet. The removable filtrate cartridge may be constructed and arranged to facilitate flow out of a filtration chamber formed by filtration zones of adjacent filter plates at the second outlet.

In accordance with one or more aspects, a filter press is disclosed. The filter press may comprise any filter plate as described herein.

In some aspects, the filter press may further comprise a source of a slurry fluidly connected to an inlet of the filter press for separation. In at least some aspects, the source of the slurry may be associated with a mining operation. The filtrate cartridges may be made of a corrosion-resistant material.

In at least some aspects, each filter press plate of the filter press may include first and second filtrate cartridges on opposite faces and opposite sides of the filter press plate.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 illustrates a filtrate cartridge in accordance with one or more embodiments;

FIG. 5 provides a cross-sectional view illustrating flow channels of a filtrate cartridge in accordance with one or more embodiments;

FIGS. 7A, 7B and 8 present data as discussed in the accompanying Example.

DETAILED DESCRIPTION

Figure 1:
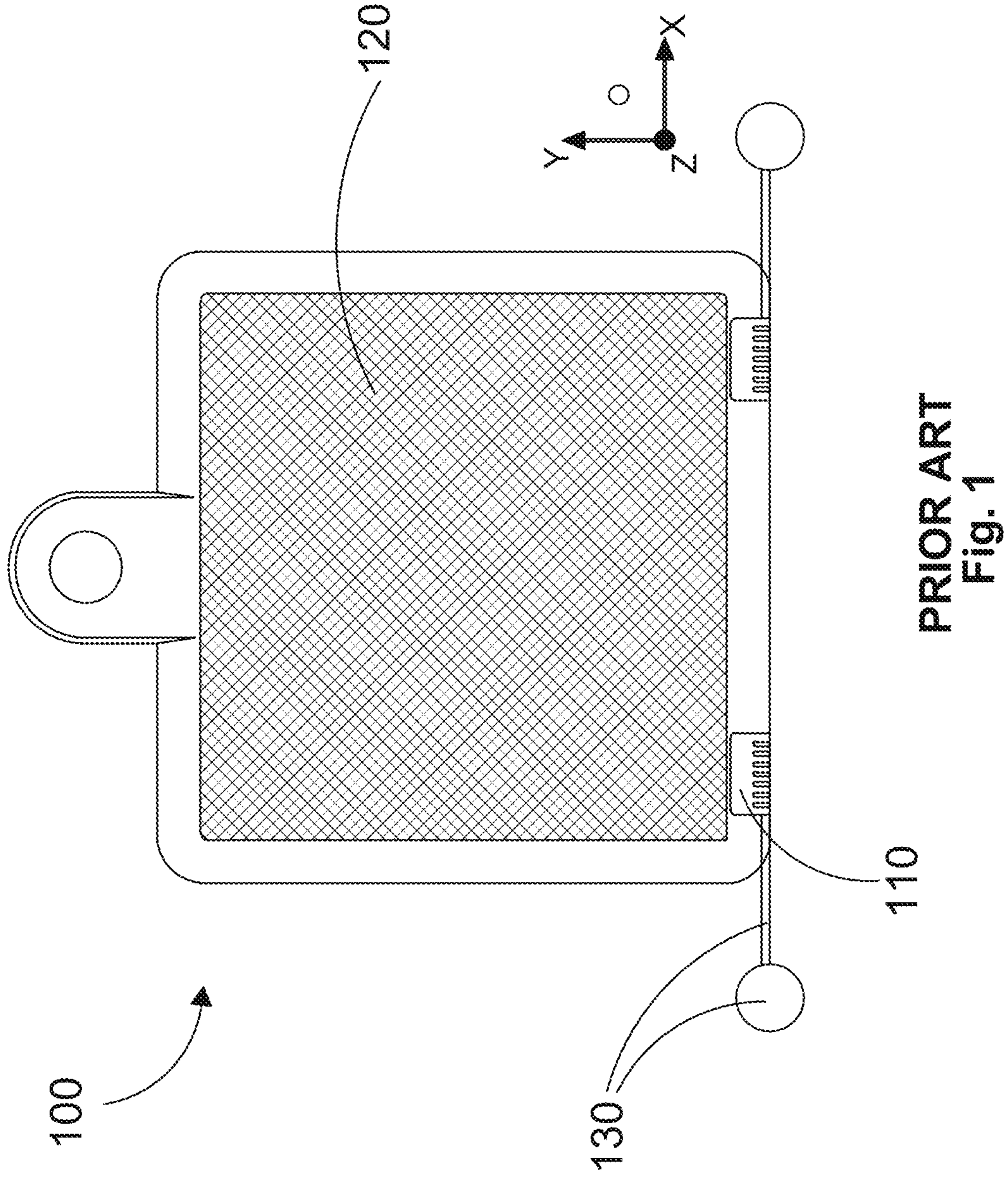
FIG. 1 illustrates a prior art filter plate.

In accordance with one or more embodiments, methods of retrofitting filter plates for use in filter presses are disclosed. The retrofit may increase drainage from filter chambers of the filter press to facilitate high volume and/or high flow rate applications. Turbulence within the filter chambers may also be reduced which may, in turn, reduce incidence of backup and/or inefficient flow. The retrofit may involve the insertion of filtrate cartridges in filter plate frames as discussed herein. The filtrate cartridges may generally provide a more open flow area compared to conventional filter plate drains which may beneficially improve and smooth flow. Flow through filter chambers defined by the retrofitted filter plates may generally be characterized as high flow, low velocity. Notably, the retrofit may also reduce the frequency of costly repair or replacement of the filter plates and/or their various components. For example, filter plates, cloths, membranes and/or associated outlet piping may generally be safeguarded from tears, abrasion and/or other damage that may arise from the processing of abrasive slurries. The design of conventional filter plates, and particularly their associated flow characteristics, amplifies the deleterious effect of abrasive slurries on filter press equipment. The retrofit described herein may therefore increase the number of cycles achievable in between required maintenance events. Retrofitted filter plates in accordance with various embodiments may be particularly useful for applications pertaining to the mining industry.

Various types of filter plates are utilized in filter presses, depending primarily upon the material to be filtered and the process requirements. For example, one type of plate is a cloth-type chamber plate which includes recessed surfaces on opposite sides of the plate each of which serves to form a filter chamber with an adjacent plate when the plates are clamped together. A cloth filter covers each of these recessed surfaces and is either mounted on the plate by a gasket or is draped between two adjacent plates. Thus, slurry is pumped into the filter chambers formed between the filter cloths of two adjacent plates, and the liquid from the slurry passes through the filter cloth and is discharged through filtrate ports in the plates. The solids are trapped in the filter chamber and form a cake.

Another type of filter plate which is utilized when process requirements call for production of a dryer filter cake is a diaphragm-type squeeze plate. The construction of this type of plate is similar to the cloth-type chamber plate, but the drainage surfaces on the opposite faces of the plate are flexible diaphragms or membranes which define pressurizing chambers there behind. A filter cloth covers the outer face of the diaphragm on each side of the plate and typically extends beyond the plate, i.e., the filter cloths are typically draped between the adjacent plates. In this case, slurry is pumped into the filter chambers formed between two neighboring plates and the liquid portion of the slurry passes through the filter cloths and is discharged through filtrate ports in the plates. After the filling cycle is complete and the filter chambers formed between adjacent plates are filled with solids, and before the press is opened, heated air or hot pressurized water is supplied to the chamber located behind each diaphragm, causing the diaphragms to flex outward and exert mechanical pressure on the filter cake. This also effects heating of the filter cake which, in conjunction with a vacuum applied to the discharge side of the filter cloths, causes additional moisture to be removed from the filter cake. An example of this type of arrangement and process is the J-Vap® dewatering and drying system commercially available from the present Applicant.

Diaphragm-type squeeze plates are designed for high-pressure squeeze and must be ported for filtrate discharge. The diaphragm plates are relatively expensive as compared to the cloth-type chamber plates discussed above, for example being typically two to three times as expensive. In this regard, the diaphragm in one conventional construction is integrally joined around the periphery thereof to the ring-like frame of the filter plate, such as by welding. In another conventional construction the diaphragm is a wholly separate plate which overlies and is fixed to the side face of the ring-like frame by fasteners such as screws. Also, the face of the diaphragm which is located behind the filter cloth is typically ribbed in order to define flow paths for liquid discharge behind the filter cloth, and the filter cloth must typically be draped between adjacent plates, which can result in increased liquid leakage from the press. Because of the above, the diaphragms are relatively thick in order to provide structural integrity to the plate. For example, a typical diaphragm may have a thickness of about 0.120 inch between the ribs and about 0.250 inch at the ribs). As such, the thickness of the diaphragm causes a large temperature drop thereacross which impedes heating and thus drying of the filter cake, and this thickness can also impede effective squeezing of the filter cake. These factors thus increase cycle time and decrease the overall operational efficiency of the press.

In accordance with one or more embodiments, a filter press may have a frame with a pair of generally horizontally elongated and parallel side rails which are disposed in sidewardly spaced relation. Head assemblies are mounted on the frame adjacent opposite ends of the side rails, with a first head assembly being disposed adjacent one end of the side rails for movement horizontally in a lengthwise direction of the side rails forwardly toward and rearwardly away from a second head assembly so as to be respectively positioned in closed and open positions. The second head assembly is stationarily positioned adjacent the other end of the side rails. A plurality of plates are supported on and between the side rails for movement therealong between the two head assemblies. The plates are pushed together into a horizontally extending closed stack and clampingly held between the two head assemblies when the first head assembly is moved toward the second head assembly into the closed position. A plate shifting arrangement effects individual and sequential shifting of the plates from the closed stack along the side rails in the rearward direction toward the first head assembly when in the open position. A first group of plates includes first plates having a frame with a pair of oppositely disposed faces which are recessed inwardly. A liquid impermeable diaphragm or membrane is fixed to the frame and extends across one of the recessed faces to define a first pressure chamber therebetween, and another liquid impermeable membrane is fixed to the frame and extends across the other recessed face to define a second pressure chamber therebetween. A second group of plates includes second plates having a frame with a pair of oppositely disposed faces which are recessed inwardly. A liquid permeable filter member (i.e. cloth or sheet) is fixed to the frame thereof and extends across one of the recessed faces to define a first drainage chamber in communication with a filtrate discharge passage. A second liquid permeable filter member is fixed to the frame and extends across the other recessed face to define a second drainage chamber in communication with a filtrate discharge passage. The first and second plates are disposed in an alternating manner along the side rails in adjacent sealing contact with each other in the closed position of the press so that each two adjacent plates (i.e., the adjacent first and second plates) define a filter chamber therebetween for filtering and collecting solids from a slurry entering the filter chamber. The liquid portion of the slurry penetrates the filter member, enters the drainage chamber, and exits the filter press via a filtrate discharge passage, while the solid portion of the slurry remains in the filter chambers. The pressure chamber defined between the liquid impermeable membrane and the recessed face is in fluid communication with a fluid source which expands the membrane towards the opposed adjacent filter member to pressurize the slurry to facilitate liquid-solid separation.

As noted above, one issue when using a filter press to separate solids from liquids is that in some applications the slurry is abrasive such as in mining applications. As a result, there are parts of the filter press plate that are subjected to wear. One particular area that is subjected to wear is the outlet distributor. Often the distributor is an integral part of the filter press plate. As a result, if the wear becomes too great, the entire filter press plate will need to be replaced which can be expensive. The distributor or rejector may be associated with the frame of the filter press plate.

FIG. 1 presents a prior art filter plate 100. The filter plate 100 includes a base drain 110. In some non-limiting aspects, the base drain 110 may generally be in the filtration zone 120. Filter plate 100 may be associated with turbulent and high velocity flow in the context of filter press operation which is inefficient and which may contribute to damage of one or more components. For example, base drain 110, filtration zone 120, and/or associated downstream outlet port and manifolding 130 may be damaged by the processing of abrasive slurries with filter plate 100.

In accordance with one or more embodiments, a filter plate may be retrofitted to improve flow and reduce damage. In some specific embodiments, the retrofitted filter plate may be intended for use in mining applications where treated slurries are particularly abrasive.

In accordance with one or more embodiments, a method of retrofitting a filter plate is disclosed. A filter plate may generally include a filtration zone surrounded by a frame. The frame may be altered to receive a filtrate cartridge as described herein. For example, in some non-limiting embodiments, the frame may be machined to accommodate the filtrate cartridge. For example, an L-shaped recess or void may be machined into the frame. The filtrate cartridge may then be inserted in the frame. The filtrate cartridge should generally be flush with the frame.

In at least some embodiments, one or more preexisting drains in a filter plate may be blocked, plugged or blanked. Thus, substantially all flow will resultantly proceed through the inserted filtrate cartridge.

In accordance with one or more embodiments, the filtrate cartridge may be positioned anywhere along the filter frame. In some non-limiting embodiments, the filtrate cartridge may be positioned in a corner of the filtrate frame. In other embodiments, the filtrate cartridge may be positioned along the base or along a side of the filter frame. In some embodiments, two or more filtrate cartridge may be inserted into the filter frame. For example, a filtrate cartridge may be positioned at each of two or more corners of the filter frame.

In accordance with one or more embodiments, the filtrate cartridge may be positioned outside of the filtration zone of the filter plate. Thus, the filtrate cartridge does not extend into the filtration zone of the filter plate. In at least some embodiments, the filtrate cartridge is positioned within a sealing area of the filter plate.

Figure 2:
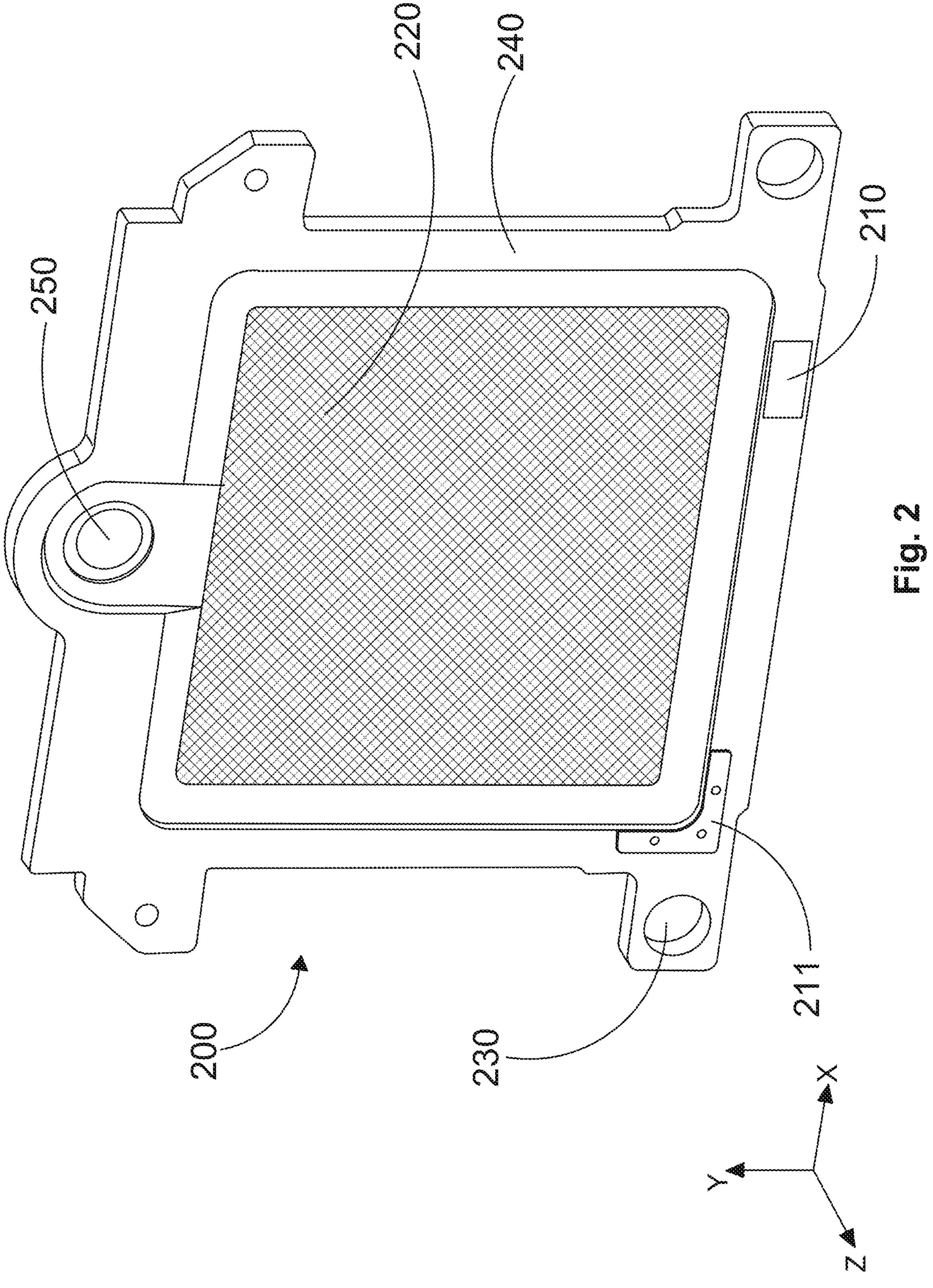
FIG. 2 illustrates a retrofitted filter plate in accordance with one or more embodiments.

FIG. 2 presents a retrofitted filter plate 200 in accordance with one or more embodiments. The filter plate 200 includes frame 240 surrounding filtration zone 220. Filtrate cartridge 211 has been inserted in a corner of frame 240 and preexisting base drain 210 has been plugged. In some embodiments, filter cartridge 211 may be positioned elsewhere along frame 240. In some embodiments, two or more filter cartridges 211 may be positioned along frame 240. Filter plate 200 may be integrated into a filter press (not shown). In operation, process slurry to be treated may be introduced to filter plate 200 at inlet manifold 250 and flow through filtration zone 220 with improved flow dynamics. Filtrate may exit at filtrate cartridge 211 and not at blocked base drain 210. Filtrate may then flow from filtrate cartridge 211 through discharge manifolding 230 for downstream processing, collection and/or end use delivery.

Beneficially, velocity and/or turbulence may be reduced at one or more of filtration zone 220, filtrate cartridge 211 and/or discharge 230 in connection with filter plate 200 (versus filter plate 100). Likewise, flow rate and/or flow-through associated with filter plate 200 may be higher in comparison to filter plate 100.

In a filter press, a plurality of filter plates are generally arranged in series to create a plurality of filtration chambers therebetween in which cakes are formed during operation. The filtration chambers may each have a left outlet and a right outlet. In turn, each filter plate may have a first filtrate cartridge as described herein associated with the left outlet, and a second filtrate cartridge as described herein associated with the right outlet. The first filtrate cartridge may generally be positioned with a first side of the filter plate and the second filtrate cartridge may generally be positioned on a second side of the filter plate. More specifically, the first filtrate cartridge may be inserted in a first side of the filter plate frame, and the second filtrate cartridge may be inserted in a second side of the filter plate frame.

FIG. 3 illustrates a filtrate cartridge 311 in accordance with one or more embodiments. The filtrate cartridge 311 may have any desired geometry which may generally be optimized to maximize the area available for drainage and to effect desired flow characteristics. Slots 360 may generally allow inlet flow into the cavity of the cartridge.

In some embodiments, the filtrate cartridge may be of unitary construction. This may allow for the internal part of the cartridge to be more open to allow for better flow out of the plate. This part may be made from abrasive resistant material to improve life of the cartridge. The internal profile may be shaped to improve flow out of the filtration chamber into the discharge port. By using a single piece cartridge, it may be possible to improve the flow distribution of the filter press plate allowing for greater throughput and also to provide a simpler replacement part which improves maintenance.

Figures 4A, 4B:
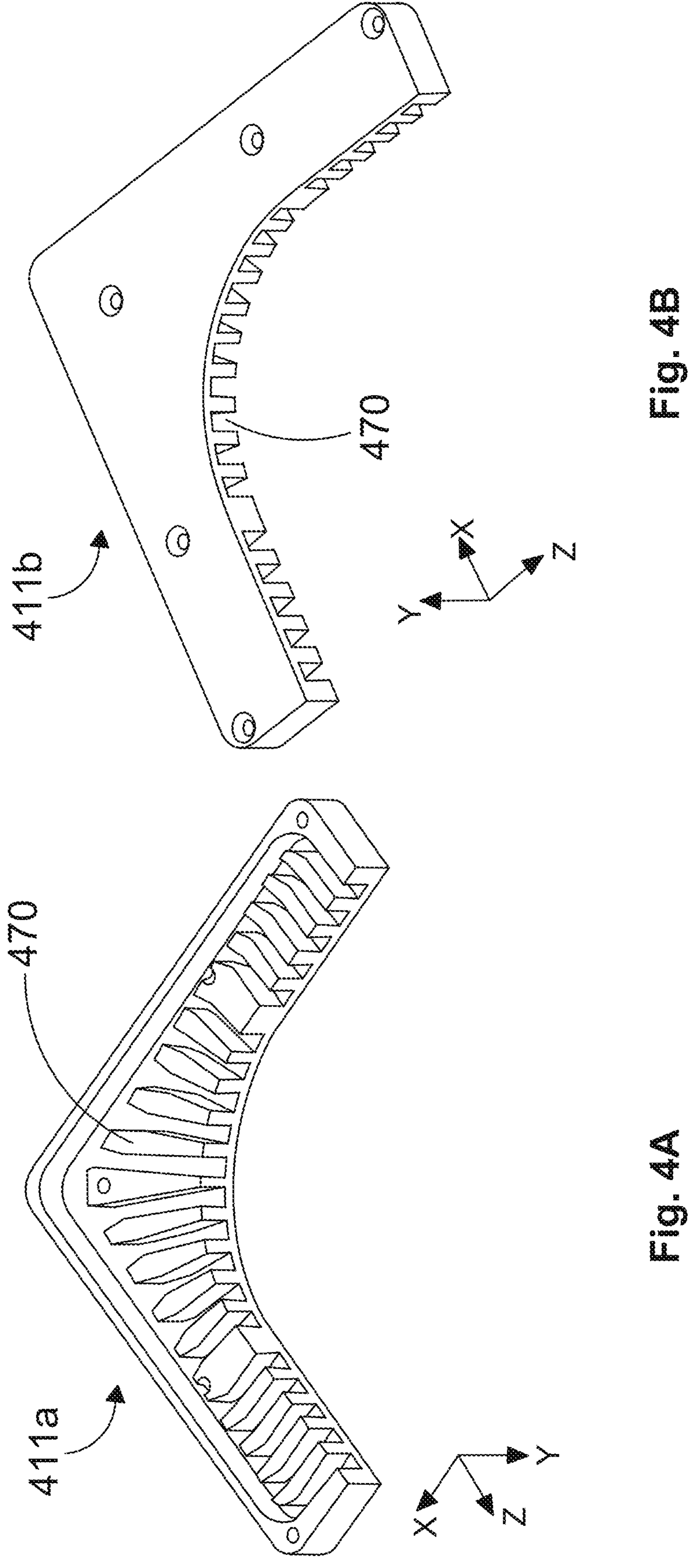
FIGS. 4A-4B provide an exploded view of a modular filtrate cartridge in accordance with one or more embodiments.

In accordance with one or more other embodiments, the filtrate cartridge may be of modular construction. FIGS. 4A and 4B illustrate a modular filtrate cartridge 411*a/b*. Filter plates may vary widely in thickness and the filtrate cartridge should generally span the filter plate thickness. The filtrate cartridge may be customized or, in the case of a modular design, first and second components 411*a/b* may be bridged or spanned to accommodate a specific filter plate thickness. For example, a shim may be used in some non-limiting embodiments. In general, the filtrate cartridge design may generally be informed by manufacturability but also for optimized flow properties. In some embodiments, modular filtrate cartridge 411*a/b* may define interior flow channels 470.

FIG. 5 provides a cross-sectional view of filtrate cartridge 511. The filtrate cartridge 511 may generally define a plurality of interior flow channels 570. Internal cavity flow channels 570 may direct flow through the cartridge and their design may be optimized to promote desirable flow characteristics. The filtrate cartridge 511 may be configured to reduce filtrate velocity and/or turbulence at a discharge port. The filtrate cartridge 511 may be configured to facilitate flow distribution and/or throughput in the filtration chamber defined by the filter plate.

Figures 6A, 6B:
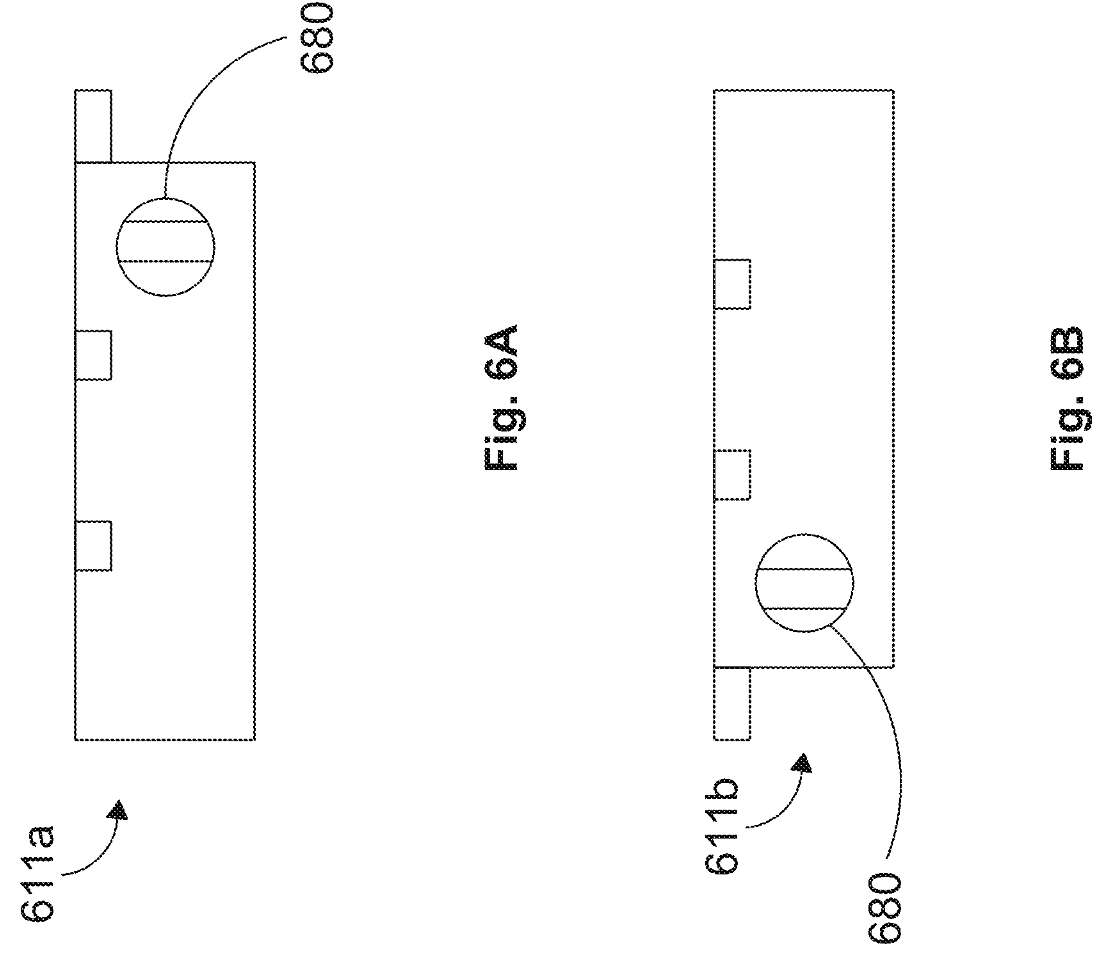
FIGS. 6A-6B illustrate filtrate cartridges having discharge ports for left-handed and right-handed installation, respectively.

As mentioned above, a filter press may include a plurality of filter plates. The filter plates may be arranged in an alternating configuration to accommodate related inlet and/or outlet manifolding. The filter cartridges may be constructed and arranged to accommodate their intended installation. For example, in some non-limiting embodiments, discharge ports on the filtrate cartridges may be customized. FIG. 6A illustrates a filter cartridge 611*a* with discharge port 680 intended for left-hand installation and FIG. 6B illustrates a filter cartridge 611*b* with discharge port 680 intended for right-hand installation. In some embodiments, a filter cartridge 611*a* may be installed on a first side of a filter frame, and a filter cartridge 611*b* may be installed on a second side of the filter frame to accommodate related discharge manifolding.

The function and advantages of these and other embodiments can be better understood from the following examples. These examples are intended to be illustrative in nature and are not considered to be limiting the scope of the invention.

Example: Velocity Contours

CFD analysis was performed on a filter press including conventional prior art filter plates as well as on a filter press including retrofitted filter plates as described herein. The flow patterns in the filter chambers between the filter plates were visualized from inlet to outlet. Assumptions included single phase, incompressible, turbulent flow with water as the working fluid. Each filter press included four filter plates and three filter chambers therebetween. Regarding boundary conditions, three inlets were used with a flowrate of 83 GPM per chamber and a velocity of 15 feet per second. The conventional filter press had one outlet on the left and one outlet on the right. The retrofitted design included two outlets on the left and two outlets on the right. Applied outlet pressure was 1 atm.

Figure 7A:
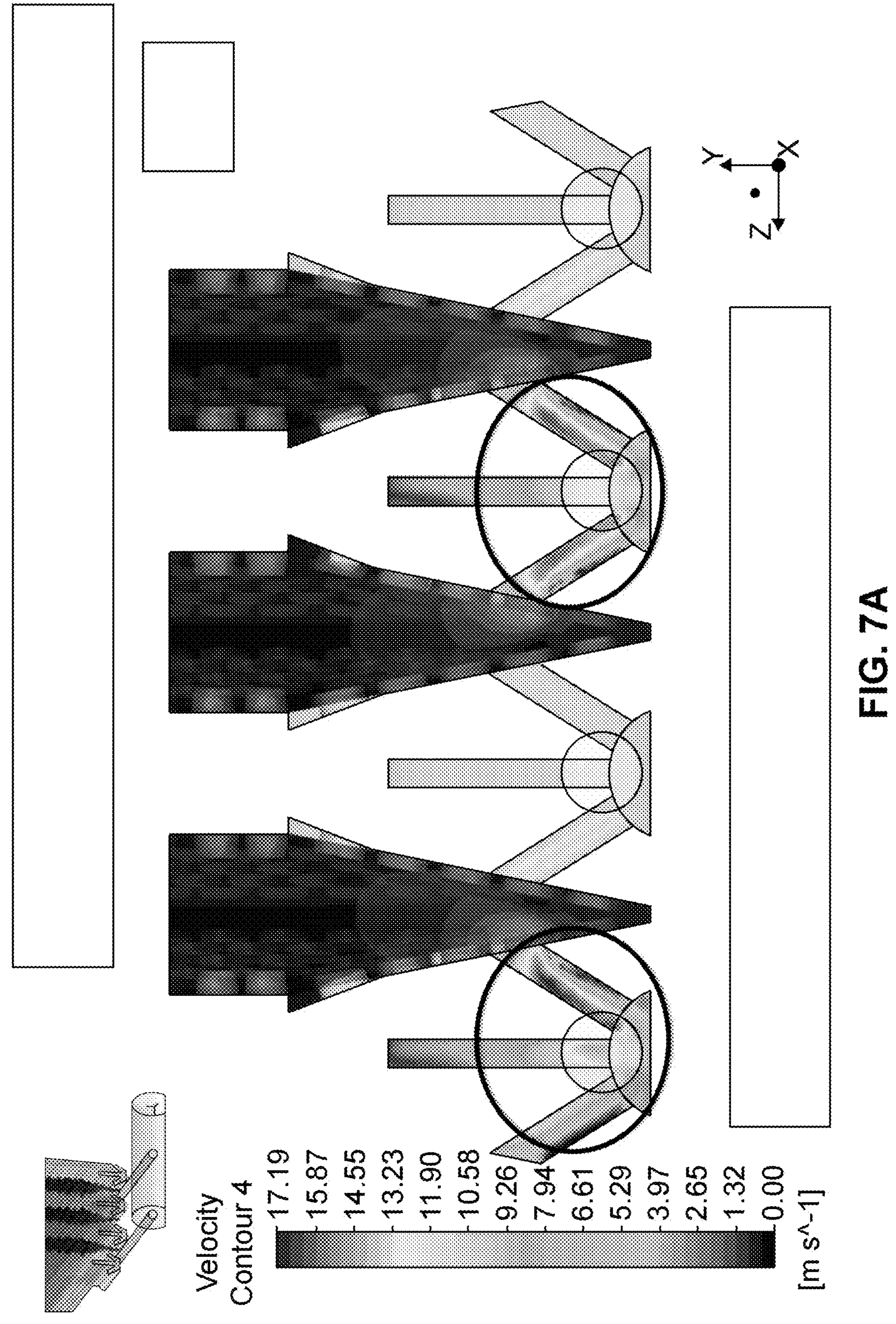

Regarding the conventional filter press, FIG. 7A presents velocity contour data in the vicinity of the filter plates near the outlet and FIG. 7B presents velocity contour data in the vicinity of the outlet hole. High velocity greater than 10 m/s was detected throughout which causes erosion, particularly when processing a working fluid containing abrasive material. Velocities of about 15 m/s or greater were detected near the outlet and velocities of about 20 to 25 m/s or greater were detected in the vicinity of the outlet hole. The flow was generally turbulent and swirling in nature.

Figure 8:
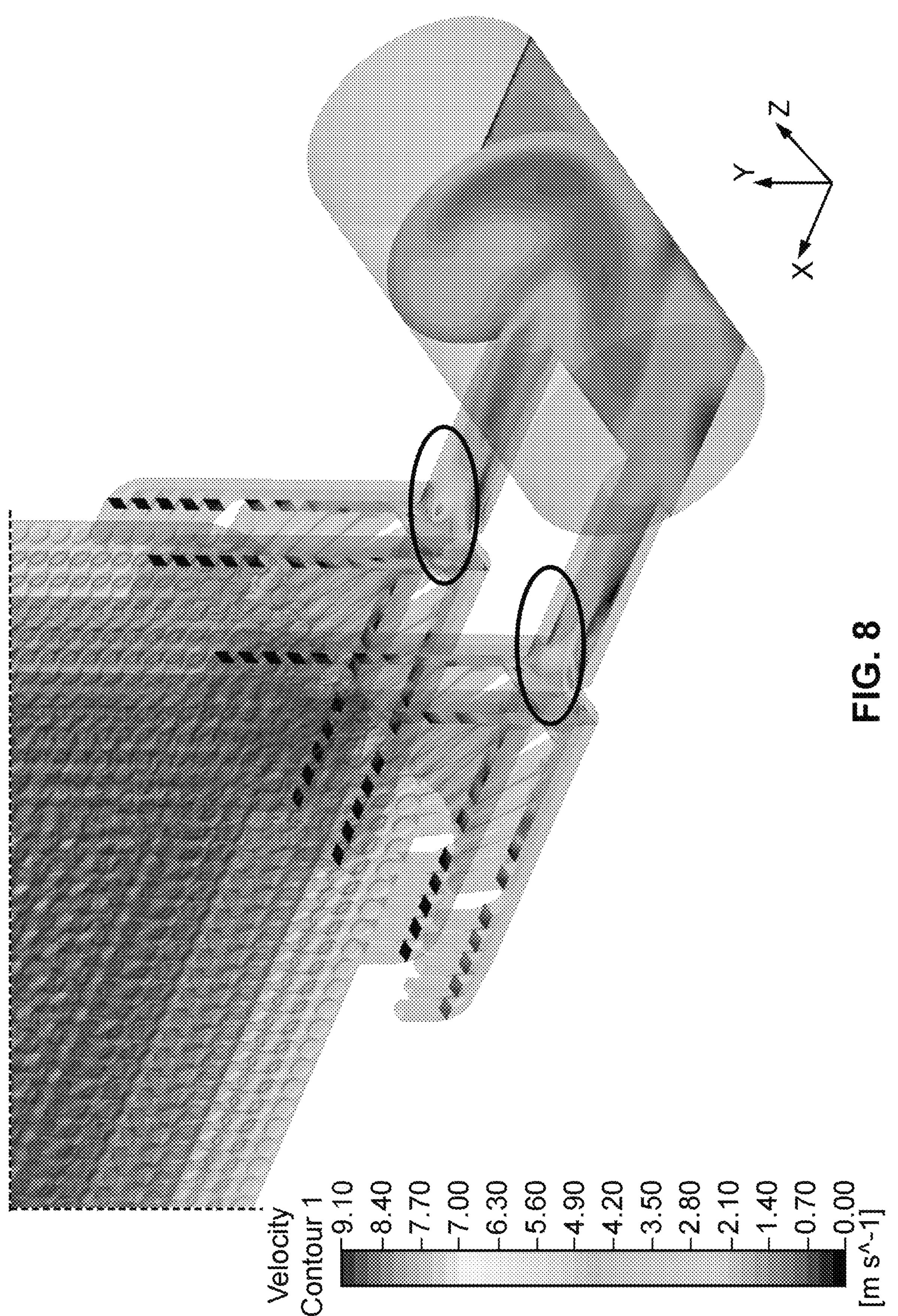

Regarding the retrofitted filter press, FIG. 8 presents velocity contour data throughout the array with a maximum velocity of about 4.0 m/s at the insert slots and about 5.5 m/s at the outlet holes. The flow was generally smooth in nature.

The CFD analysis confirmed superior fluid flow dynamics in the retrofitted filter press. The retrofitted filter press was therefore expected to result in reduced equipment damage, higher flow and improved throughput.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

The invention claimed is:

1. A method of retrofitting a filter press plate, comprising:

providing a filter press plate including a recessed face defining a filtration zone and a frame surrounding the filtration zone;

altering the frame to removably receive a filtrate cartridge, the filtrate cartridge constructed and arranged to facilitate flow out of a filtration chamber formed by filtration zones of adjacent filter press plates to a discharge port; and inserting the filtrate cartridge in the frame.

2. The method of claim 1, wherein the filtrate cartridge is positioned outside of the filtration zone of the filter press plate.

3. The method of claim 2, wherein the filtrate cartridge is positioned within a sealing area of the filter press plate.

4. The method of claim 1, wherein the filtrate cartridge is positioned in a corner of the frame.

5. The method of claim 1, wherein the filter press plate is not used to mount the filtrate cartridge.

6. The method of claim 1, wherein the filtrate cartridge does not extend into the filtration zone of the filter press plate.

7. The method of claim 1, wherein the filtrate cartridge is of modular construction.

8. The method of claim 7, further comprising bridging first and second components of the modular filtrate cartridge to accommodate a thickness of the filter press plate.

9. The method of claim 1, wherein the filtrate cartridge defines a plurality of flow channels.

10. The method of claim 9, wherein the filtrate cartridge is configured to reduce filtrate velocity and/or turbulence at the discharge port.

11. The method of claim 9, wherein the filtrate cartridge is configured to facilitate flow distribution and/or throughput in the filtration chamber.

12. The method of claim 1, wherein the filter press plate includes an integral manifold port to facilitate fluid communication with the discharge port via the filtrate cartridge.

13. The method of claim 1, further comprising plugging a preexisting outlet in the frame.

14. The method of claim 1, further comprising fluidly connecting the filtrate cartridge to the discharge port.

15. The method of claim 1, further comprising altering the frame to removably receive a second filtrate cartridge and inserting the second filtrate cartridge in the frame, wherein the first and second filtrate cartridges are on opposite faces and opposite sides of the filter press plate.

16. The method of claim 1, further comprising installing the retrofitted filter press plate in a filter press.

17. The method of claim 16, further comprising introducing a source of a slurry to the filter press for separation.

18. The method of claim 17, wherein the source of the slurry is associated with a mining operation.

19. The method of claim 16, further comprising taking the filter press offline and replacing the filtrate cartridge in the filter press plate after a predetermined period of time.

20. The method of claim 16, further comprising retrofitting at least two filter press plates and installing the at least two retrofitted filter press plates in the filter press.

* * * * *